United States Patent [19]

Morrow

[11] Patent Number: 5,755,863
[45] Date of Patent: May 26, 1998

[54] SEALING COMPOSITION FOR INFLATED ARTICLES

[76] Inventor: Raymond V. Morrow, 2148 Amlisa Dr., Nazareth, Pa. 18064

[21] Appl. No.: 856,046

[22] Filed: May 14, 1997

Related U.S. Application Data

[63] Continuation of Ser. No. 593,746, Jan. 29, 1996, abandoned.

[51] Int. Cl.$^6$ .................................................. C09K 3/12
[52] U.S. Cl. .................................... 106/33; 106/189
[58] Field of Search ................................. 106/33, 189

[56] References Cited

U.S. PATENT DOCUMENTS

| | | | |
|---|---|---|---|
| 3,352,696 | 11/1967 | Wallace | 106/33 |
| 3,920,061 | 11/1975 | Japp et al. | 152/504 |
| 3,931,843 | 1/1976 | Edwards et al. | 152/504 |
| 4,216,812 | 8/1980 | Bourne | 152/504 |
| 4,294,730 | 10/1981 | Kenney | 524/13 |
| 4,298,805 | 11/1981 | Dubow | 427/231 |
| 4,439,561 | 3/1984 | Barber | 106/33 |
| 4,607,065 | 8/1986 | Kitamura et al. | 522/83 |
| 4,776,888 | 10/1988 | Morrow | 106/33 |
| 5,226,958 | 7/1993 | Bowman et al. | 106/33 |
| 5,391,224 | 2/1995 | Pasuit et al. | 106/33 |

*Primary Examiner*—Mark I. Bell
*Assistant Examiner*—Louis M. Troilo
*Attorney, Agent, or Firm*—Haynes and Boone; James R. Bell

[57] ABSTRACT

A sealing system and sealing composition are provided for inflatable articles containing air under pressure. The sealing composition includes particles or particulates of three-dimensional shapes having sharp corners thereon which tend to dig into the article around the opening and wedge themselves therein. The sealing composition also includes fibers, at least some of which are fibrillated. The fibers tend to wrap around the particles and further plug the leak opening. The particles and the fibers are in a liquid carrier which also tends to form a bond of the particles and fibers in the leak opening. The particles in the composition have dimensions covering a particular range of sizes for different articles, the larger dimension being useful in larger dimension articles, such as large tires for construction machines, and the smaller dimension being useful in smaller articles such as footballs and basketballs, for example.

9 Claims, 1 Drawing Sheet

SEALING COMPOSITION FOR INFLATED ARTICLES

This is a continuation of application Ser. No. 08/593,746, filed Jan. 29, 1996, now abandoned.

FIELD OF THE INVENTION

This invention relates generally to a sealing composition for inflated articles and more particularly to three-dimensional particles in the composition for assisting in forming a mechanical seal in response to a leak occurring in the article.

BACKGROUND OF THE INVENTION

A large number of compositions have heretofore been known which are intended to seal leaks in pneumatic tires, and such compositions have been used with varying degrees of success. Some of the compositions have been reasonably effective for sealing leaks if a puncture occurs in a relatively short period of time after the composition is applied to the interior of the tire. Effectiveness diminishes, however, over a period of time due to evaporation of some of the composition, separation of the solids from the liquid, chemical interaction between components of the composition, or mechanical dissipation of the material by spreading too thinly on the interior walls of the tire after extended periods of use. Other compositions have tended to sag and form lumps or masses within the tire that cause the tire to become unbalanced, particularly at higher speeds of the automobile.

Some sealing compositions have also tended to congeal or solidify at lower temperatures so that the sealing effectiveness is substantially non-existent at low temperatures, during winter operation of the vehicle. On the other hand, other compositions have been essentially destroyed or rendered ineffective at high temperatures because of chemical interaction or evaporation. Also, the viscosity of the composition may be reduced in hot weather to the point that the composition does not block or seal a puncture but is simply forced through the opening by the pressure within the tire.

Heretofore, sealing compositions which have been effective for pin-hole leaks and small punctures are not effective for larger punctures. Some compositions which are fairly effective with automobile tires may not work well with truck tires which contain higher air pressure. One attempt to overcome this problem provides a mechanical seal including a multiplicity of particles or particulates of triangular shapes having sharp corners thereon in a wide range of sizes. When a leak in an article is formed, the air pressure therein forces the particles into the leak opening and wedges them against the surface of the article around the opening.

While this approach is effective, it requires one formulation of the composition to include the triangular particles of a first size for one application such as for basketballs, footballs and the like, and triangular particles of another size, larger than the first size, in another formulation of the composition for another application such as for heavy duty applications in tires for construction vehicles.

The foregoing illustrates limitations of the known prior art. Thus it is apparent that it would be advantageous to provide an alternative directed to overcoming one or more of the limitations as set forth above. Accordingly, a suitable alternative is provided including features and benefits more fully disclosed hereinafter.

SUMMARY OF THE INVENTION

In one aspect of the present invention, this is accomplished by providing a sealing composition for sealing a leak opening in an inflatable article containing air under pressure. The composition includes a multiplicity of three-dimensional particles each having shapes with a plurality of sharp corners, a multiplicity of fibers, and a liquid carrier. The particles are of a size to block the leak opening, the fibers being wrapped on the particles in the leak opening, and the liquid forming a binder to bind the particles and fibers at the opening.

In another aspect of this invention, this is accomplished by providing a sealing composition for inflatable articles containing gas under pressure, the composition comprising a multiplicity of particles of polyethylene or polycarbonate, the particles being of three-dimensional shapes having sharp corners thereon, the particles being present in an amount of two or four parts, by weight, and having a first dimension in a first direction in a size from about eighteen to about twenty mesh and having a second dimension in a second direction in a size from about eight to about ten mesh, as measured by Tyler screen sizes, a multiplicity of fibrillated fibers in lengths from one and one-half to three millimeters and being present in an amount of ten to twelve parts, by weight, and a carrier comprising ethylene glycol, gums, adhesives, corrosion and rust inhibitors, anti-oxidant agents and anti-bacterial agents, being present in an amount from eighty-four to eighty-eight parts, by weight.

In a further aspect of this invention, this is accomplished by providing a sealing composition for inflatable articles containing gas under pressure, the composition comprising a multiplicity of particles of plastic material, the particles being of three-dimensional geometric shapes each having a plurality of sharp corners thereon, the particles being present in an amount of one to ten parts, by weight, and having multiple dimensions in a range of sizes from about eight to about twenty mesh, as measured by Tyler screen sizes, a multiplicity of fibrillated fibers in lengths from one-half to six millimeters, and being present in an amount of six to sixteen parts, by weight, and a carrier comprising ethylene glycol, gums, adhesives, corrosion and rust inhibitors, in an amount of eighty to ninety-two parts, by weight.

The foregoing and other aspects will become apparent from the following detailed description of the invention when considered in conjunction with the accompanying drawing figures. It is to be expressly understood, however, that the figures are not intended as a definition of the invention, but are for the purpose of illustration only.

BRIEF DESCRIPTION OF THE DRAWING FIGURES

FIG. 1 is a perspective view illustrating an embodiment of a three-dimensional particle of this invention showing at least four faces; and FIG. 2 is a perspective view illustrating another embodiment of a three-dimensional particle of this invention.

DETAILED DESCRIPTION OF THE INVENTION

The present invention provides a sealing composition which forms a mechanical seal and includes a multiplicity of particles or particulates of three-dimensional shapes having sharp corners thereon and having multiple dimensions.

The composition also includes fibers, at least some of which are fibrillated, as by being ball-milled, to further fiberize the fibers. The ends of fibers, for example, can be treated to produce a plurality of fibrous ends thereon by such a treatment. After the particles are wedged in the opening, the fibers wrap around the particles and the mass wedges more fully mechanically in the opening by air tending to escape therethrough and by movement of the walls of the tire on the support surface during operation of the vehicle.

The composition further includes ethylene glycol as a carrier for the fibers and the particles. In addition, gums, adhesives, anti-rust ingredients and anti-corrosion ingredients are employed with the ethylene glycol carrier, as has heretofore been known.

In a preferred form, the sealing composition can be made for a plurality of applications. For example, the composition can be used for basketballs, footballs, and the like, being supplied in one-ounce syringes. The composition can be used in construction tires and tires for over-the-road machines and mining machines, being supplied in fifty gallon drums. The composition can also be used for bicycles tires, small tires for lawn and garden tractors, forklifts, tires with thirteen to fifteen inch rims, tires with fifteen to nineteen inch rims, and tires with rims exceeding nineteen inches, by way of example. Further, the sealing compositions for the particular applications and customers can be dyed to different colors to make the particular grade readily apparent. Typically, the sealant is supplied to the tire through the tire valve, after the valve core is first removed.

Figure 1:
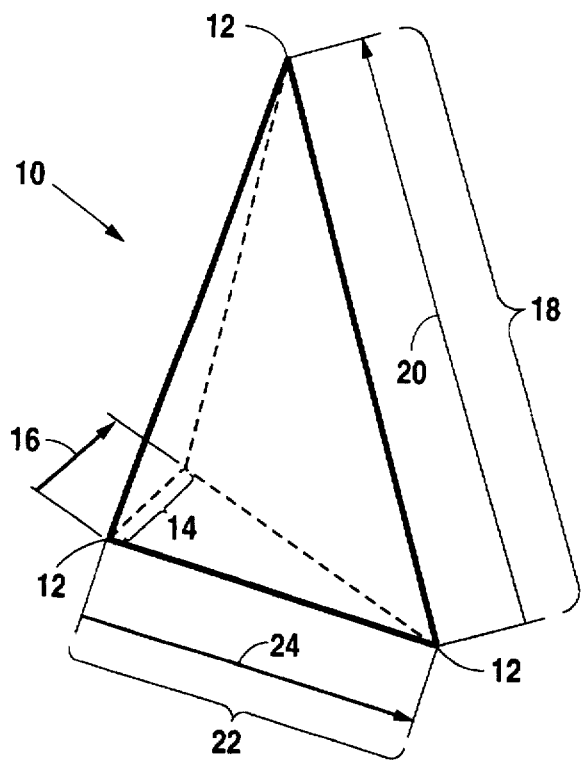
Figure 2:
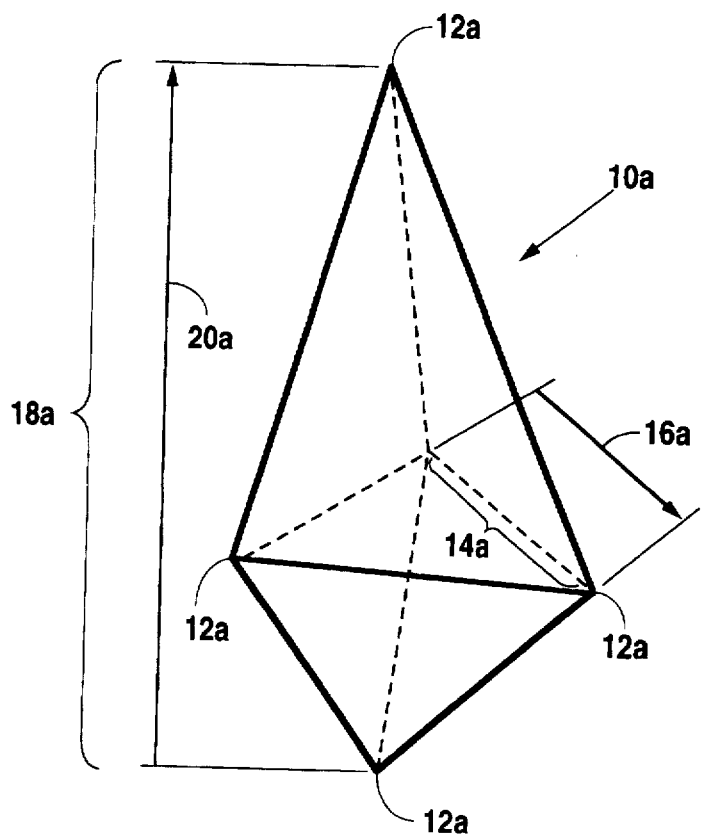

The particles in the sealing composition are the most important single ingredient which contributes the most to the effectiveness of the sealant. The particles are of polyethylene or polycarbonate and have sharp corners thereon, being three-dimensional, preferably of a tetrahedron or octahedron shape. The dimensions of the particles are also important for the particular applications. Referring now to FIGS. 1 and 2, three-dimensional particles are designated 10 and 10a. Particle 10 comprises generally a tetrahedron geometric shape including sharp corners 12, a first dimension 14 extending in a first direction as indicated by a directional arrow designated 16, and a second dimension 18 extending in a second direction as indicated by a directional arrow designated 20. First dimension 14 is a size from about eighteen to about twenty mesh as measured by Tyler screen sizes, and second dimension 18 is greater than first dimension 14 and is a size from about eight to about ten mesh as measured by Tyler screen sizes. Directional arrows designated 16 and 20 are angularly disposed relative to each other.

Particle 10a comprises generally an octahedron geometric shape including sharp corners 12a, a first dimension 14a extending in a first direction as indicated by a directional arrow designated 16a, and a second dimension 18a extending in a second direction as indicated by a directional arrow designated 20a. First dimension 14a is a size from about eighteen to about twenty mesh as measured by Tyler screen sizes, and second dimension 18a is greater than first dimension 14a and is a size from about eight to about ten mesh as measured by Tyler screen sizes. Directional arrows designated 16a and 20a are angularly disposed relative to each other.

For heavy duty applications, i.e., large vehicle tires, some of the particles 10, 10a pass through an eight mesh screen and are held by a ten mesh screen, ninety-eight percent passing through the eight mesh screen and two percent passing through the ten mesh screen. This, of course, depends on the orientation of the greater or lesser dimension of the particles with the screen. For other applications, i.e., basketballs, footballs, etc., some of the particles 10, 10a pass through an eighteen mesh screen and are held by a twenty mesh screen, ninety-eight percent passing through the eighteen mesh screen and two percent passing through the twenty mesh screen. Again, this depends on the orientation of the greater or lesser dimension of the particles with the screen. Since the particles are in random, constantly changing orientation within the sealing composition, a portion of the particles will become wedged into an opening in the inflated article.

In view of the greatest and least dimensions which can be used in forming the three-dimensional geometric particles, there may also be intermediate dimensions of the particles which fall between the greatest or least dimensions. Therefore, such a range of dimensions is possible so as to accommodate not only the applications mentioned above, but for applications such as small tires with four to twelve inch rims, for example, such as used on lawn and garden tractors, golf carts, and trailers. For example, particle 10, FIG. 1, can be constructed to have a least dimension 14, a greatest dimension 18 and a third dimension 22, which is greater than dimension 14 and less than dimension 18, extending in a third direction as indicated by a directional arrow designated 24. As can be appreciated, a wide range of dimensions and shapes can be formulated for the sealing composition.

Accordingly, if desired, a combination of the three-dimensional particles and planar triangular particles may be used.

The fibers employed in the sealing composition are also an important ingredient thereof. When a leak in the form of an opening occurs in the inflated article, the air under pressure tends to force the sealant through the opening. The advantage of using the three-dimensional particles 10, 10a lies in the many dimensions included in such particles depending on their orientation with the opening. The dimensions 14, 18, 22, 14a and 18a are merely exemplary of the range of dimensions included in such particles. A portion of the particles with their sharp corners, and depending on their orientation with the opening, will wedge in the opening, with the corners digging into the surface of the article at the opening. These particles tend to form a dam in the opening, and fibers which tend to pass out of the opening under the pressure of the air, wrap around the particles to substantially close off the opening. The liquid carrier then tends to form a binder for the particles and fibers to complete the sealing off of the opening. The fibers need not all be of one material but, preferably at least a portion of them are of cotton and are fibrillated in a ball-mill to produce fibrous ends on the fibers. The fibers are preferably from one and one-half to three millimeters in length and are present in a quantity, by weight, of several times the quantity of the particles. The particles and fibers in combination produce a high packing index or packing structure for the sealing composition.

The liquid carrier for the solid particles and fibers primarily comprises ethylene glycol. However, the liquid carrier also includes gums, adhesives, corrosion and rust inhibitors, anti-oxidants, and anti-bacterial agents, all of which have been employed in sealing compositions heretofore known.

By way of illustration, the sealing composition according to the invention includes a multiplicity of particles of plastic material, with the particles being present in an amount of about one to about ten parts, by weight, and preferably two to four parts, by weight, and in a size ranging from eight to twenty-mesh, as measured by Tyler screen sizes. The composition further includes a multiplicity of fibrillated fibers, being present in an amount from about six to about sixteen parts, by weight, preferably from ten to twelve parts, by weight, and having a length from about one-half to about six millimeters and preferably from one and one-half to three millimeters. A liquid carrier comprising ethylene glycol, gums, adhesives, corrosion and rust inhibitors, anti-oxidants, and anti-bacterial agents is present in an amount from about eighty to about ninety-two parts, by weight, and preferably about eighty-four to about eighty-eight parts, by weight.

While this invention has been illustrated and described in accordance with a preferred embodiment, it is recognized that variations and changes may be made therein without departing from the invention as set forth in the claims.

Having described the invention, what is claimed is:

1. A single sealing composition for sealing multiple size leak openings in a variety of inflatable articles containing air under pressure, said composition comprising a multiplicity of three-dimensional particles including at least four faces and each having shapes including width, height and thickness dimensions, each dimension being different from each other dimension, with a plurality of sharp corners thereon, a multiplicity of fibers, and a liquid carrier, said particles being in sufficient number so that at least one of the dimensions of several of the particles is sufficient to block one of the multiple size leak openings, said fibers being wrapped on the particles in the leak opening, and said liquid forming a binder to bind the particles and fibers at the opening.

2. The sealing composition as defined in claim 1 wherein the three-dimensional particles have at least four planar, non-parallel sides and include a first dimension in a first direction, a second dimension in a second direction greater than the first dimension and a third dimension in a third direction greater than the first dimension and less than the second dimension.

3. The sealing composition as defined in claim 2 wherein the first, second and third directions are angularly disposed relative to each other.

4. The sealing composition as defined in claim 2 wherein the three-dimensional particles have multiple dimensions in a range of sizes of from eight to twenty mesh, as measured by Tyler screen sizes.

5. The sealing composition as defined in claim 1, and further comprising:

a multiplicity of planar, triangular particles combined with the three-dimensional particles.

6. A sealing composition as defined in claim 2 for use with inflatable articles selected from the group consisting of basketballs, football, soccer balls, and tires, said particles having at least one dimension in one direction in a size of from eighteen to twenty mesh, as measured by Tyler screen sizes.

7. A sealing composition as defined in claim 2 for use with inflatables articles selected from the group consisting of large tires for construction machines and over-the-road and mining machines, said particles having at least one dimension in one direction in a size of from eight to ten mesh, as measured by Tyler screen sizes.

8. A sealing composition as defined in claim 1 wherein the geometric shape is a tetrahedron.

9. A sealing composition as defined in claim 1 wherein the geometric shape is an octahedron.

* * * * *